United States Patent
Srinivasan et al.

(10) Patent No.: US 11,354,116 B2
(45) Date of Patent: Jun. 7, 2022

(54) UPDATING REMOTE DATABASES

(71) Applicant: Honeywell International Inc., Morris Plains, NJ (US)

(72) Inventors: Divya Swarup Giriyappa Srinivasan, Bangalore (IN); Thomas D. Judd, Woodinville, WA (US); Derek Mitchell, Kirkland, WA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/544,709

(22) Filed: Aug. 19, 2019

(65) Prior Publication Data

US 2021/0055924 A1 Feb. 25, 2021

(51) Int. Cl.
| | |
|---|---|
| *G06F 9/44* | (2018.01) |
| *G06F 8/658* | (2018.01) |
| *H04B 7/185* | (2006.01) |
| *H04L 9/32* | (2006.01) |
| *G06F 8/71* | (2018.01) |

(52) U.S. Cl.
CPC .............. *G06F 8/658* (2018.02); *G06F 8/71* (2013.01); *H04B 7/18506* (2013.01); *H04L 9/3247* (2013.01)

(58) Field of Classification Search
CPC ....... G06F 8/658; G06F 8/71; H04B 7/18506; H04L 9/3247
See application file for complete search history.

(56) References Cited

U.S. PATENT DOCUMENTS

| | | | | |
|---|---|---|---|---|
| 6,151,602 | A | * | 11/2000 | Hejlsberg ............... H04L 67/06 |
| 7,185,332 | B1 | * | 2/2007 | Waldin .................... G06F 8/658 717/170 |
| 8,831,795 | B2 | | 9/2014 | Cabos |
| 2005/0105518 | A1 | * | 5/2005 | Hwang ................ H04L 1/0041 370/373 |
| 2008/0163192 | A1 | * | 7/2008 | Jha ........................ G06F 8/65 717/173 |
| 2008/0215407 | A1 | | 9/2008 | Pachon et al. |
| 2013/0028174 | A1 | * | 1/2013 | Cabos .................. H04L 51/063 370/316 |
| 2014/0237462 | A1 | * | 8/2014 | Zheng ...................... G06F 8/62 717/170 |
| 2017/0046962 | A1 | * | 2/2017 | Shipley ................ G08G 5/0013 |

(Continued)

OTHER PUBLICATIONS

Olive et al., "Systems and Methods for a Secure Subscription Based Vehicle Data Service", U.S. Appl. No. 15/970,521, filed May 3, 2018; pp. 1-34.

(Continued)

*Primary Examiner* — Hang Pan
(74) *Attorney, Agent, or Firm* — Fogg & Powers LLC

(57) ABSTRACT

Systems and methods for updating remote databases are provided. In certain embodiments, a method includes determining an installed version for a remote database stored on a vehicle computer. Further, the method includes identifying an incremental update for the remote database, wherein the incremental update contains differences between a desired version for the remote database and the installed version. Additionally, the method includes providing the incremental update to the vehicle computer. Also, the method includes updating the remote database with the incremental update.

20 Claims, 6 Drawing Sheets

(56) References Cited

U.S. PATENT DOCUMENTS

2018/0121188 A1* 5/2018 Srinivasan ......... H04B 7/18506
2018/0173723 A1* 6/2018 Pfeifle ................... G06F 16/148

OTHER PUBLICATIONS

Olive et al., "Systems and Methods for Encrypted Vehicle Data Service Exchanges", U.S. Appl. No. 15/970,522, filed May 3, 2018; pp. 1-41.

* cited by examiner

UPDATING REMOTE DATABASES

BACKGROUND

In certain operations, an organization may maintain a database that is separately stored on multiple remotely-located systems. Throughout the lifecycle of these systems, the organization may perform updates for the remotely-stored databases. To perform the update for the multiple remotely-stored databases, an individual, in possession of media storing an updated version of the database, may go to the remotely located devices and direct the update of the remotely-stored database. For example, an airline operation center (AOC) may maintain separately-stored AOC databases on aircraft or other vehicles associated with the airline. In order to update the remotely-stored databases maintained on the multiple remotely-located vehicles, maintenance individuals may wait for the various aircraft to arrive. When the aircraft arrive, the maintenance individuals may physically connect a dataloader to the vehicles and update the databases with the updated database stored on the dataloader.

SUMMARY

Systems and methods for updating remote databases are provided. In certain embodiments, a method includes determining an installed version for a remote database stored on a vehicle computer. Further, the method includes identifying an incremental update for the remote database, wherein the incremental update contains differences between a desired version for the remote database and the installed version. Additionally, the method includes providing the incremental update to the vehicle computer. Also, the method includes updating the remote database with the incremental update.

DRAWINGS

Understanding that the drawings depict only some embodiments and are not therefore to be considered limiting in scope, the exemplary embodiments will be described with additional specificity and detail using the accompanying drawings, in which.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made.

In certain embodiments, remotely-stored databases may be incrementally updated to avoid costs associated with sending maintenance individuals to the multiple vehicles where the databases are stored, reducing the delays for deploying vehicles while the databases are updated, and costs of updating across a fleet of vehicles. To update the remotely-stored databases, an organization may acquire an identifier for a remotely-stored database. Based on the identifier, the organization may identify incremental updates that may be performed that change the remotely-stored database such that the remotely-stored database contains a desired version of a database. When the incremental updates are identified, the organization may provide the incremental updates to a vehicle computer that contains the remotely-stored database, where the vehicle computer is on the remotely-located vehicle without sending human personnel to the remotely-located vehicle, where the individual is charged with the task of updating the database. In addition to providing the incremental update, the organization may also provide integrity information that can be used by the remotely-located system to verify that the update of the remotely-stored database is performed correctly. When the remotely-located system receives the update information, the remotely-located system may perform an update of the associated database and verify that the update was performed correctly. By providing incremental update information without sending a dedicated individual to perform the update, the organization may save time and money when updating multiple remotely-stored databases especially when considering the endeavor of updating an entire fleet.

Figure 1:
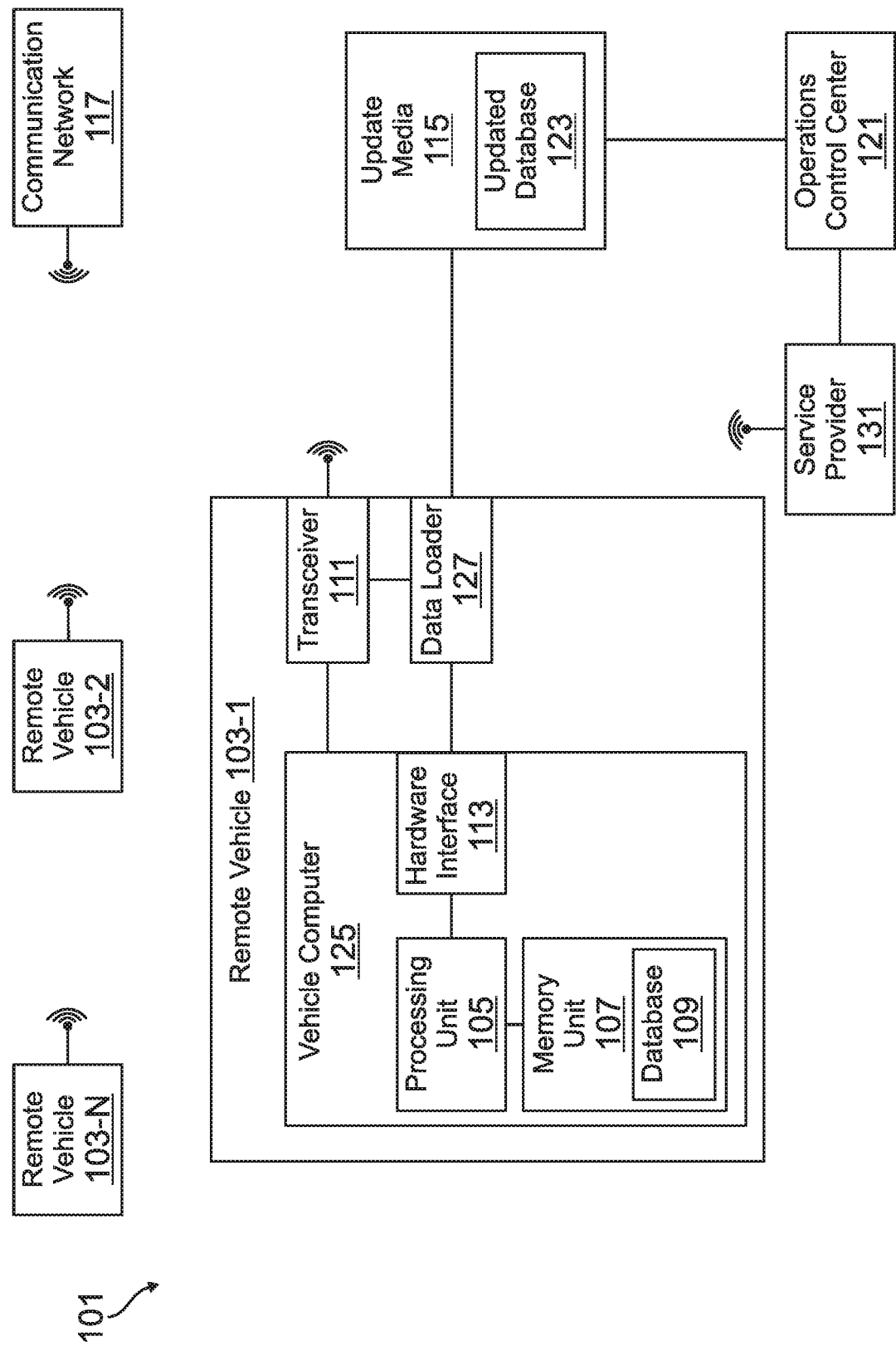
FIG. 1 is a block diagram illustrating an exemplary system for updating remotely-stored databases according to an aspect of the present disclosure.

FIG. 1 is a block diagram illustrating a system 101 for updating a remotely-stored database 109 maintained on a remote vehicle 103. As used herein, a remote vehicle 103 may refer to a vehicle in a group of vehicles, where the different vehicles are located at different locations. For example, as illustrated, the system 101 may include three or more separate remote vehicles 103: a first remote vehicle 103-1, a second remote vehicle 103-2, and an nth remote vehicle 103-N, where the first remote vehicle 103-1, the second remote vehicle 103-2, and the nth remote vehicle 103-N are located at different locations. When referred to herein, a remote vehicle is referred to generally as a remote vehicle 103, except when needed to distinguish from other remote vehicles 103 in the system 101. In some embodiments, the different remote vehicles 103 may be managed by the same organization as part of a fleet of vehicles. For example, the remote vehicles 103 may be aircraft that are managed by an airline, third party services, business jets, and small fleets of aircraft. Alternatively, when the remote vehicles 103 are aircraft, the remote vehicles 103 may be managed by an air traffic control center. In further alternative embodiments, the different remote vehicles 103 may include ships, automobiles, trains, spacecraft, or other object capable of motion and any combination of different vehicle types that are managed by an associated organization.

In certain embodiments, the operation of a remote vehicle 103 may be controlled by a vehicle computer 125, which may include a processing unit 105 and a memory unit 107. As used herein, the processing unit 105 may be a device that executes computer executable instructions that direct the processing unit 105 to control one or more tasks performed by the remote vehicle 103. In some embodiments, the instructions may be stored on the memory unit 107 for execution, another memory storage device within the remote vehicle 103, received through a communication network 117 and executed as the instructions are received by the processing unit 105, and the like.

The processing unit 105 or other computational devices found within a remote vehicle 103 may be implemented using software, firmware, hardware, or other appropriate combination thereof. The processing unit 105 and other computational devices may be supplemented by, or incorporated in, specially-designed application-specific integrated circuits (ASICs) or field programmable gate arrays (FPGAs). The processing unit 104 and other computational devices may also include or function with software programs, firmware, or other computer readable instructions for carrying out various process tasks, calculations, and control functions used in the present methods and systems.

Further, methods described herein may be implemented by computer executable instructions, such as program modules or components, which are executed by at least one processing unit, such as the processing unit 105. Generally, program modules include routines, programs, objects, data components, data structures, algorithms, and the like, which perform particular tasks or implement particular abstract data types. Instructions for carrying out the various process tasks, calculations, and generation of other data used in the operation of the methods described herein can be implemented in software, firmware, or other computer readable instructions. These instructions are typically stored on any appropriate computer program product that includes a computer readable medium used for storage of computer readable instructions or data structures. Such a computer readable medium may be any available media that can be accessed by a general purpose or special purpose computer or processor, or any programmable logic device. In certain implementations, the computer readable medium may be stored on the memory unit 107.

Suitable computer readable storage media, such as that found as part of the memory unit 107, may include, for example, non-volatile memory devices including semi-conductor memory devices such as random access memory (RAM), read only memory (ROM), electrically erasable programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

In certain embodiments, the memory unit 107 may store a database 109. As referred to herein, the database 109 may be a data structure that stores information that may be used by the remote vehicle 103 during operation of the remote vehicle 103. The database 109 may store information that is used to coordinate the operation of the remote vehicle 103 in relation to other remote vehicles 103. For example, the remote vehicle 103-1 may store information within the database 109 that allows the remote vehicle 103-1 to coordinate the operation of the remote vehicle 103-1 with the operation of the remote vehicle 103-2 and the remote vehicle 103-N. As the database 109 is stored on a remote vehicle, the database 109 may also be referred to as a remote database 109. However, the remote database 109 is generally referred to as database 109.

In additional embodiments, the database 109 may store information that allows aspects of the operation of the remote vehicle 103 to be directed by an external operations control center 121, such as an organization, a company, and the like. For example, the remote vehicles 103 may be aircraft that are associated with an airline. The airline may provide the information stored within the database 109 that allows the airline to control aspects of the operation of the remote vehicle 103. By controlling the operation of the remote vehicle 103, the airline may be able to coordinate the operation of one remote vehicle 103 with other remote vehicles 103 throughout the larger system 101.

When an airline controls the operation of the remote vehicle 103 using information in the database 109, the database 109 may be referred to herein as an airlines operation center (AOC) database. An AOC database may store data that defines, among other things, AOC message uplinks (format, data included, display/HMI info, etc.), AOC message downlinks (format, data included, display/HMI info, etc.), etc. The AOC database may also define data for the downlink source that may include data entered on display/HMI, uplink data, I/O data, etc. The data stored in the AOC database may further define information for the uplink and downlinks messages that includes formats, content (downlink data from sources like HMI/display entry, uplink message data, I/O data, other values available to a configuration management unit, etc.), triggers (logic defined for when a downlink message is triggered or when a send is sent from a downlink page), etc.

In alternative embodiments, the database may store information related to flight operations such as fuel information, flight plans, service details, gate assignments, rosters, flight crew information, or other information that is related to the operations of an airline. Alternatively, in contrast to an airline maintaining data within the database 109, the information within the database 109 may be provided by an air traffic control (ATC) center. When the database 109 stores information associated with an ATC center, the ATC center may provide information to be stored in the database 109 that coordinates the operation of the remote vehicle 103 with other remote vehicles 103. For example, the database may store information related to flight plans, flight paths, and the like.

In further embodiments, where the remote vehicles 103 are not aircraft but other vehicles maintaining databases 109, the database 109 may store information related to the operation of the multiple remote vehicles 103. For example, an organization may direct the databases 109 to store information that coordinates the operations of the remote vehicles 103.

In certain embodiments, the processing unit 105 may communicate with other remote vehicles 103 and with the operations control center 121 through a communication channel, such as a communication network 117, where the communication channel is a path through which information can be exchanged between a remote vehicle 103 and the operations control center 121. Additionally, the operations control center 121 may communicate through the communication network 117 by communicating through a service provider 131, where the service provider 131 provides communication services to the operations control center and manages a communication facility for communicating through the communication network 117. Additionally, to communicate through the communication network 117, the remote vehicle 103 may include a transceiver 111. The processing unit 105 may provide signals to the transceiver 111 that enables the transceiver to send and receive data through the communication network 117. In additional embodiments, the communication network 117 may be one or more communication channels through which separate remote vehicles 103 may transmit and receive data with each other and the operations control center 121. For example, the communication network 117 may allow the remote vehicles 103 to communicate through a very high-frequency (VHF), a high-frequency (HF), satellite communications (SAT-COM), and similar mobile air to ground, air to air, or ground-based communication networks and subnetwork mediums. In some implementations, the communication network mediums may comprise at least one of a gate link network, a Wi-Fi network, a worldwide interoperability for microwave access (WiMAX) network, an AeroMACs network, an aircraft communications addressing and reporting system (ACARS) network, one or more cellular communications networks, broadband SATCOM (e.g., GOGO), Iridium, Inmarsat, and the like.

In certain embodiments, the processing unit 105 may also be connected to a hardware interface 113 in the vehicle computer 125. As used herein, the hardware interface 113 may refer to a connection point on the vehicle computer 125, where an individual may connect media to the vehicle computer 125 and access the data on the memory unit 107. For example, the hardware interface 113 may permit the connection of Personal Computer Memory Card International Association ((PCMCIA) network cards to the vehicle computer 125. Accordingly, a user may insert a PCMCIA network card into the hardware interface 113 to provide information to and acquire information from the vehicle computer 125. The hardware interface 113 may also provide connections to one or more other types of media. For example, the hardware interface 113 may be a CD drive, a DVD drive, a USB connection, an ethernet connection, an SD card, or other type of connection through which data may be provided through external media to the remote vehicle 103.

In some embodiments, the operations control center 121 may create an updated database 123 to replace the database 109 stored in the memory unit 107. While the operations control center 121 may be able to communicate with the multiple remote vehicles 103 through the communication network 117, the transmission of the updated database 123 to the remote vehicles 103 may present some challenges to the organization affiliated with the operations control center 121, which challenges are described below.

In some embodiments, separate organizations from the organization affiliated with the operations control center 121 may control a communication network 117 and these separate organizations may charge a fee to others for data transmitted through their communication network 117. For example, airlines pay a fee for transmitting data through the ACARS network that is proportional to the amount of data transmitted. Thus, in part due to the cost of transmitting information through the communication network 117, methods do not exist for transmitting a large updated database 123 through the communication network 117 by the operations control center 121 to the various vehicles within a large fleet.

In certain embodiments, due to the size of the fees associated with providing an updated database 123 to the fleet of aircraft or other similarly arranged remote vehicles 103, organizations associated with some operations control centers 121 may typically employ individuals with the task of manually installing the updated database 123 on the remote vehicles 103 using an update media 115 upon which the updated database 123 is stored when the remote vehicles 103 arrive at locations having maintenance individuals available. As described herein, the update media 115 may be computer readable media capable of interfacing with the data loader 127. The update media 115 may load the updated database 123 onto the data loader 127 or other device capable of interfacing with the hardware interface 113 on the remote vehicle 103. Accordingly, the data loader 127 interfaces with the hardware interface 113 on the vehicle computer 125 to replace the database 109 stored on the memory unit 107 with the updated database 123.

However, using individuals to manually install the updated database 123 stored on the update media 115 may also have some drawbacks. In particular, the use of individuals may take time and have similar high costs (though not as high as the transmission costs). For example, an organization associated with the operations control center 121 may have to wait for the employed individuals to gain access to the remote vehicles 103 managed by the organization. Further, the organization may also incur costs due to employing multiple individuals to install the updated database 123. Accordingly, systems and methods described herein allow organizations associated with the operation control centers 121 to update remotely-stored databases through a communication network 117 without having to incur exorbitant fees for transmitting large amounts of data through the communication network 117 or face the drawbacks associated with employing human personnel to manually install the updated databases 123 on the remote vehicles 103. Additionally, due to the effort and time used to update the database for the entire fleet, organizations may spend more time certifying that the data in the updated databases 123 is correct before rolling out the updated databases 123 to the entire fleet.

Figure 2:
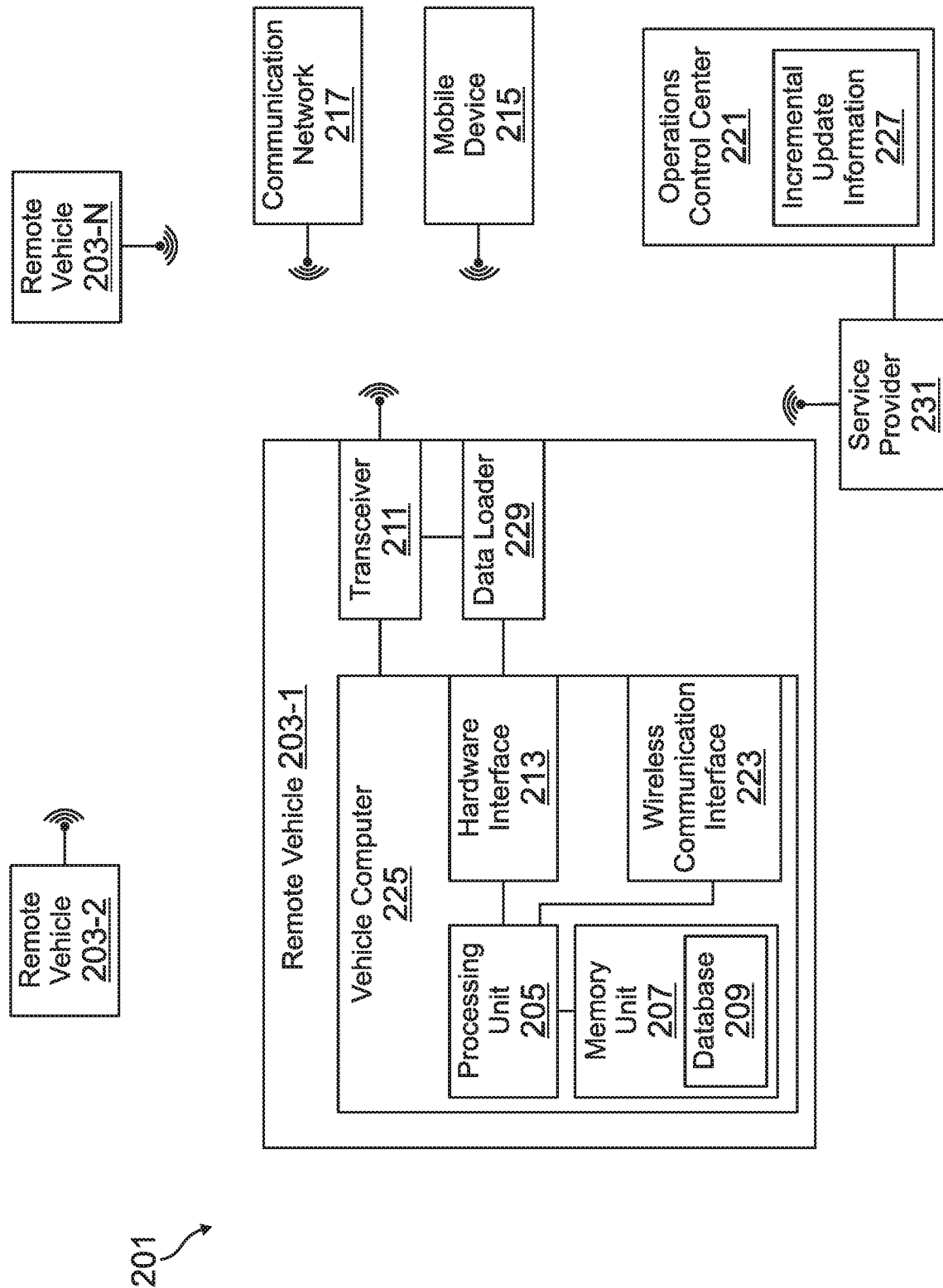
FIG. 2 is a block diagram illustrating an exemplary system for incrementally updating remotely-stored databases according to an aspect of the present disclosure.

FIG. 2 is a block diagram illustrating a system 201 for incrementally updating a remotely-stored database 209. As illustrated, the system 201 may include multiple remote vehicles 203. The remote vehicles 203 are substantially similar to the remote vehicles 103 described in FIG. 1. As shown, aspects of the operation of the remote vehicle 203 may be controlled by a vehicle computer 225 located on the associated remote vehicle 203. The vehicle computer 225 may be substantially similar to the vehicle computer 125 described in FIG. 1. As illustrated, the vehicle computer 225 may include a processing unit 205, a hardware interface 213, and a memory unit 207, where the memory unit 207 may store a database 209. The processing unit 205 may be substantially similar to the processing unit 105 described above in FIG. 1. Also, the memory unit 207 may be similar to the memory unit 107, and the database 209 may be similar to the database 109. Also, the system 201 may include a communication network 217 that is similar to the communication network 117 described above in FIG. 1. Further, the remote vehicle 203 may include a transceiver 211 and a data loader 229 that function similarly to the transceiver 111 and the data loader 127 described above in FIG. 1.

Additionally, the vehicle computer 225 on the remote vehicle 203 may include a wireless communication interface 223. As used herein, the wireless communication interface 223 may be an interface through which information may be transferred wirelessly with another device that is not physically connected to the vehicle computer 225. For example, the wireless communication interface 213 may enable communications with another devices using Wi-Fi, Bluetooth, ZigBee, or other wireless communication standard. Accordingly, the vehicle computer 225 may receive information through the wireless communication interface 223 and the hardware interface 213, which receives data through the data loader 229 or through some other physical connection. Also, the vehicle computer may receive information through the transceiver 211.

Further, the system 201 may include an operations control center 221 that communicates through a service provider 231. In many respects, the operations control center 221 and the service provider 231 may function similarly to the operations control center 121 and the service provider 131 described in FIG. 1. In contrast to the operations control center 121 in FIG. 1, the operations control center 221 may create incremental update information 227 for updating the database 209 instead of providing the updated database 123 as described above in relation to FIG. 1. As used herein, incremental update information 225 may refer to information that can be used by the processing unit 205 to update the database 209 such that the database 209 contains the information desired by the operations control center 221. For example, when an organization associated with the operations control center 221 desires that the database 209 reflect an updated database, such as the updated database 123 in FIG. 1, the operations control center 221 may send incremental update information 225 to the vehicle computer 225 on the remote vehicle 203, whereupon the processing unit 205 may use the received incremental update information 225 to update the database 209 such that the database 209 contains the desired version of the database 209.

In certain embodiments, when the operations control center 221 creates an updated database to replace the remotely-stored database 209 on the remote vehicle 203, the operations control center 221 may send a request to the remote vehicle 203 for identification information that identifies a current state of the database 209. For example, the identification information may be a version number of the database 209, a checksum of the data stored in the database 209, a date of installation for the database 209, or other information, or combination thereof, that may be used by the operations control center to identify the current state of the database 209.

In some embodiments, upon receiving the request for identification information for the database 209, the processing unit 205 may acquire the desired identification information and transmit the identification information back to the operations control center 221. Alternatively, the processing unit 205 may acquire the identification information by accessing the memory unit 207, where the desired identification information may be stored.

In some embodiments, the operations control center 221 (communicating through the service provider 231) and the processing unit 205 may transmit the request for the identification information and the identification information through the communication network 217 via the transceiver 211. For example, the operations control center 221 may provide the request for the identification information to the service provider 231 for transmission to the remote vehicle 203 through the communication network 217, whereupon the processing unit 205 receives the request through the transceiver 211. Upon reception of the request, the processing unit 205 may acquire and transmit the requested identification information back to the operations control center 221 through the communication network 217 and the service provider 231.

In alternative embodiments, the operations control center 221 and the remote vehicle 203 may communicate requests for the identification information and the identification information through an intermediary mobile device 215. As used herein, the mobile device 215 may be a mobile device that can be brought within close proximity to the remote vehicle 203 and can communicate with the operations control center through networks other than the communication network 217 (i.e., Wi-Fi, Gatelink, and the like). In particular, the mobile device 215 may be a device where the installation of a database is a secondary purpose for the mobile device 215. For example, the mobile device 215 may be a smart phone, a laptop, an electronic flight bag, tablet, or other mobile device.

In some embodiments, when the mobile device 215 is proximately located to the remote vehicle 203, the mobile device 215 may communicate with the processing unit 205 through the wireless communication interface 213 to acquire and store the identification information for the database 209. Accordingly, the mobile device 215 may maintain a record of the identification information for the database 209 when the mobile device 215 is distantly located from the remote vehicle 203. When the mobile device 215 is brought within a local coverage area for a communication network connected to the operations control center 221, where the communication network is not the communication network 217, the mobile device 215 may provide the identification information to the operations control center 221. Alternatively, when the operations control center 221 determines that the mobile device 215 is within a local coverage area for a communication network connected to the operations control center 221, the operations control center 221 may request the identification information for the database 209 from the mobile device 215.

In certain embodiments, when the operations control center 221 receives the identification information for the database 209, the operations control center 221 may identify the incremental update information 227. In some implementations, to identify the incremental update information 227, the operations control center 221 may identify the differences between the updated database and the remotely-stored database 209. After identifying the differences between the updated database and the remotely stored database 209, the operations control center 221 may identify one or more incremental changes that can be made to the database 209 that will cause the database 209 to match the updated database. When the incremental changes are identified by the operations control center 221, the operations control center 221 may save the identified incremental changes as the incremental update information 227.

In additional embodiments, the operations control center 221 may also calculate integrity check or integrity information to include in the incremental update information 227. As used herein, integrity information may refer to data that can be used to certify that updates performed on the database 209 cause the database 209 to match the desired version of the updated database. For example, the integrity information may include a checksum of the incremental changes. Also, the integrity information may include a checksum for the updated database. Additionally, the integrity information may include digital signatures, validation information, encryption information, security data, or other information that may be used to ensure that the incremental changes are correctly provided to the remote vehicle 203 and that the update of the database 209 is performed correctly. When the integrity information is calculated, the operations control center 221 may transmit the integrity information along with the incremental changes to the remote vehicle 203 as part of the incremental update information 227.

In certain embodiments, the operations control center 221 may provide the incremental update information 227 to the service provider 231 for transmission to the remote vehicle 203 through the communication network 217. In contrast to the installation of the updated database 123 in FIG. 1, where a maintenance individual would manually install the entire updated database 123 using update media 115, the operations control center 221 may provide the incremental update information 227 to the service provider 231 for transmission to the remote vehicle 203 through the communication network 217 because the incremental update information 225 is substantially smaller than the entire updated database 123. Accordingly, due to the smaller size of the incremental update information 227, the cost associated with transmitting the incremental update information 225 through the communication network 217 is significantly smaller than transmitting the entire updated database through the communication network 217. Also, the incremental update information may fit within a max size datalink message (where the entire update will not fit).

Additionally, when the remote vehicles 203 are aircraft, many newer aircraft may have systems for uploading data via broadband (BB) datalink systems such as BB SATCOM, WiFi, Cell, etc. However, some older aircraft may not be able upload data via the BB datalink systems. Thus, by updating a database using incremental update information 225 may facilitate the servicing of older aircraft without performing an expensive upgrade to add new equipment to add BB datalink uploading of databases.

In additional embodiments, the operations control center 221 may provide the incremental update information 227 to the remote vehicle 203 through the mobile device 215. For example, when the mobile device 215 is in communication with the operations control center 221 and the operations control center 221 has identified incremental update information 227 based on the identification information acquired by the operations control center 221 from the mobile device 215, the operations control center 221 may provide the incremental update information 227 to the mobile device 215. Thus, when the mobile device 215 returns to the proximity of the remote vehicle 203, such that the mobile device 215 can connect to the remote vehicle 203 via the wireless communication interface 223, the mobile device 215 may transmit the incremental update information 227 to the vehicle computer 225 via the wireless communication interface 223.

In some embodiments, upon reception of the incremental update information 227, the processing unit 205 may generate a new database from the incremental update information 227. For example, the incremental update information may specify the operations to be performed by the processing unit 205 to change the data stored in the database 209, such that the data stored in the database 209 matches the desired version of the database as dictated by the operations control center 221. In some implementations, the incremental update information 227 may specify modifications, additions, and deletions to be made to the database 209 to bring the database 209 in concordance with the desired database version. Accordingly, the processing unit 205 may perform the specified operations within the incremental update information 227 to generate a new database. When the processing unit 205 has generated the new database, the processing unit 205 may adopt the new database as the database 209 for use by the remote vehicle 203.

Additionally, instead of generating a new database, the processing unit 205 may make changes directly to the database 209 based on the information stored in the incremental update information 227. For example, if the incremental update information 227 direct the processing unit 205 to change a particular data entry in the database 209, the processing unit 205 may perform the information directly on the data stored in the database 209. Accordingly, when the processing unit 205 has performed the instructions defined in the incremental update information 227, the database 209 may match the desired version for the database 209.

In certain embodiments, before generating the new database or making changes to the database 209, when the processing unit 205 on the vehicle computer 225 has received the incremental update information 227 from the operations control center 221, either through the communication network 217 or through an intermediary mobile device 215, the processing unit 205 may determine whether or not the incremental update information 227 was correctly transmitted to the vehicle computer 225. As described above, the incremental update information 227 may include a checksum, digital signature, or other type of information through which the processing unit 205 may perform an integrity check on the received incremental update information 227. For example, when the incremental update information 227 includes a checksum for the incremental update information, the processing unit 205 may calculate the checksum of the received incremental update information 227 and compare the calculated checksum against a received checksum in the incremental update information 227. If the calculated checksum matches the received checksum, the processing unit may proceed with updating the database 209 is described above.

If the calculated checksum fails to match the received checksum, the processing unit 205 may stop the update process for the database 209. Further, the processing unit 205 may send an indication to the operations control center 221 that the vehicle computer 225 was unable to update the database 209. In some implementations, upon reception of an indication from the vehicle computer 225 that the incremental update information 227 failed an integrity check performed by the vehicle computer 225, the operations control center 221 may attempt to retransmit the incremental update information 227 to the vehicle computer 225. If the integrity check fails after multiple attempts at transmitting the incremental update information 227 to the vehicle computer 225, the operations control center 221 may attempt to provide the incremental update information 227 to the vehicle computer 225 through other communication channels. For example, the operations control center 221 may attempt to transmit the incremental update information through the mobile device 215, through another communication link, or may direct a manual installation as described above.

In further embodiments, in addition to the integrity check, the processing unit 205 may also verify that the incremental update information 227 is compatible with one or more of the database 209, the vehicle computer 225, or other system within the remote vehicle 203. If the incremental update information 227 is not compatible with the remote vehicle 203, the processing unit 205 may direct the vehicle computer 225 to indicate to the operations control center 221 that the incremental update information 227 is not compatible with some aspect of the remote vehicle 203. Additionally, the processing unit 205 may direct the vehicle computer 225 to indicate to the operations control center 221 the manner in which the incremental update information 227 is not compatible with the particular remote vehicle 203.

When the processing unit 205 indicates to the operations control center 221 that the incremental update information 227 is not compatible with the remote vehicle 203, the operations control center 221 may wait until a future incremental update becomes available that is compatible with the remote vehicle 203, at which point the operations control center 221 may transmit the future incremental update to the vehicle computer 225 through the service provider 231. Alternatively, the operations control center 221 may provide different incremental update information 227 to the vehicle computer 225 that is or should be compatible with the operation of the remote vehicle 203.

In certain embodiments, when the processing unit 205 determines that the received incremental update information passes the integrity check and is compatible with the operation of the remote vehicle 203, the processing unit 205 may proceed with the generation of the new database or modifications to the database 209 as described above.

In some embodiments, when the processing unit 205 has generated a new database based on the incremental update information 227, the processing unit 205 may perform a further integrity check on the new database. In a similar manner as described above with regards to the integrity check performed on the received incremental update information 227, the processing unit 205 may compare the new database against an integrity measure received in the incremental update information 227. If the new database matches the received integrity measure, the processing unit 205 determines that the new database was accurately generated and matches the desired database version controlled by the operations control center 221. For example, the processing unit 205 may generate a checksum for the newly generated database. Upon calculation of the checksum, the processing unit 205 may compare the generated checksum against a received checksum in the incremental update information 227. If the checksums match, the processing unit 205 may direct the transmission of an indication to the operations control center 221 that the newly generated database was correctly generated. Additionally, if the checksums match, the processing unit 205 may direct the vehicle computer 225 to use the generated database in place of the database 209 as described above. Conversely, if the checksums do not match, the processing unit 205 may attempt to generate the database again and/or may transmit an indication to the operations control center 221 that the generation of the database 209 failed.

In certain embodiments, when a database has been generated by the processing unit 205 based on the incremental update information 227, the processing unit 205 may wait until the remote vehicle 203 and/or the vehicle computer 225 are in a safe state in which the newly generated database may be adopted as the database 209. For example, the vehicle computer 225 may be using information within the database 209 and, accordingly, the information within the database 209 may be unavailable for replacement by the newly generated database until the vehicle computer 225 has finished using the information within the database 209. In some embodiments, the safe state for the remote vehicle 203 and/or the vehicle computer 225 may be a maintenance state, where the remote vehicle 203 and/or the vehicle computer 225 are not currently using the data stored in the database 209, for example, when the remote vehicle 203 is an aircraft, the maintenance state may be when the aircraft is not flying. Alternatively, the processing unit 205 may wait until the remote vehicle 203 and/or the vehicle computer are in a state where interruption of the operation of the remote vehicle 203 is not prejudicial to operation of the remote vehicle 203. For example, when the remote vehicle 203 is an aircraft, the vehicle computer 225 may wait until the aircraft is not in the air and parked at the gate before adopting the newly generated database as the database 209. In some embodiments, the type of safe state may be dependent on the type of information in the database 209 that is being updated. In additional embodiments, the vehicle computer 225 may use the stored database 209 until a maintenance individual instructs the vehicle computer 225 to adopt the newly generated database as the database 209.

In some embodiments, when the processing unit 205 has adopted the newly generated database as the database 209, the vehicle computer 225 may transmit an indication to the operations control center 221 that the database 209 is updated. In certain embodiments, the vehicle computer 225 may also transmit identification information for the newly generated database. Upon reception of the indication from the vehicle computer 225, the operations control center 221 may update maintained information indicating the current versions of the database 209 being used by the different remote vehicles 203 that are managed by the operations control center 221.

By transmitting incremental update information 227 directly to the vehicle computer 225 through the service provider 231 and the communication network 217 or through an intermediating device, such as a mobile device 215, an operations control center 221 may avoid costs associated with transmitting an updated database through the service provider 231 and the communication network 217 and costs associated with employing individuals to update the databases manually on the different remote vehicles 203.

Figure 3:
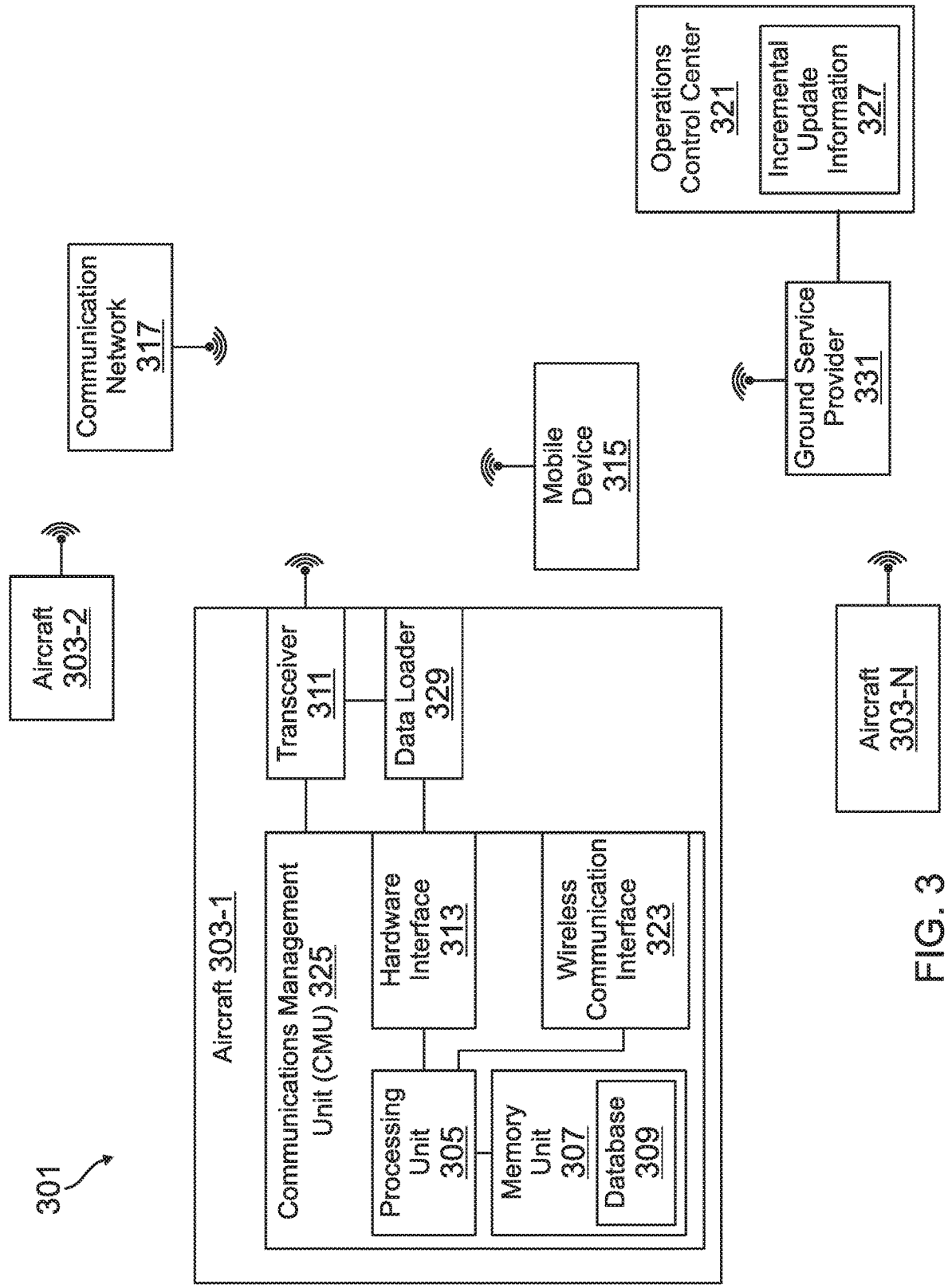
FIG. 3 is a block diagram illustrating an exemplary system for incrementally updating an airlines operation center database according to an aspect of the present disclosure.

FIG. 3 is a block diagram illustrating a system 301 for incrementally updating a remotely-stored database 309 that is maintained on a communications management unit (CMU) 325. As illustrated in FIG. 3, the system 301 may include an operations control center 321 that communicates with multiple aircraft 303. The operations control center 321 is substantially similar to the operations control center 221 described above and the ground service provider 331 is substantially similar to the service provider 231. In further implementations, as the operations control center 321 communicates with aircraft 303, the operations control center 321 may be an airlines operation center, a third party operations center, or other entity that controls the operations of smaller airlines or business jet operations.

In certain embodiments, the aircraft 303 may be similar to the remote vehicles 203 described above with respect to FIG. 2. Additionally, the processing unit 305, memory unit 307, database 309, hardware interface 313, wireless communication interface 323, transceiver 311, and data loader 329 may function similarly to the processing unit 205, memory unit 207, database 209, hardware interface 213, wireless communication interface 223, transceiver 211, and data loader 229 described above with respect to FIG. 2.

In further embodiments, the aircraft 303 may include a CMU 325, which may function in a similar manner to the vehicle computer 225 in FIG. 2. As used herein, the CMU 325 may refer to a Communication Management Unit (CMU), a Communication Management Function (CMF), another avionics line replaceable unit (such as a flight management system, certral maintenance computer aircraft condition monitoring system, etc.), or other system that includes a database that benefits from an incremental database update via a datalink. For simplicity, this specification will use the term CMU as generic for both CMU and CMF. In existing systems, the processing unit 305 in the CMU may execute a configurable Airline Operations Communication (AOC) application. In some implementations, the AOC application may be defined within the CMU using information found in the database 309. The database 309 may include information used to select various configurable options for the executable application such as: formatting and display of various uplink messages; formatting and display of various downlink message; the display of the pages and logic used to create the downlink messages; formats for printing uplink messages; and/or the logic behind the messages and display/HMI functions. Other information included in the database 309 may include information related to the airlines operations as described above. Accordingly, the CMU 325 may function as the datalink router for delivering the uplink/downlink messages associated with the incremental database update via datalink to an avionics unit that hosts the database to be updated.

In addition to the CMU, other computers may be located on-board the aircraft 303. For example, mobile devices 315 such as electronic flight bags (EFBs), smart phones, laptops, or other devices may be used for some cockpit operations by the crew. An EFB may be brought onto the aircraft by a pilot or other crew member. Other computers, other than the CMU and mobile device(s) 315, on-board the aircraft may include line replaceable units (LRUs), maintenance terminals, PADs, personal devices and other cabin terminals.

In similar embodiments to those described above in FIG. 2, the operations control center 321, be it an AOC center, a third party operations center, or a maintenance center, may provide incremental update information 327 to the CMU 325. As described above, when the incremental update information 327 is provided to the CMU 325, the incremental update information 327 may be provided directly to the CMU 325 without the use of a data loader 329. In particular, the operations control center 321 may directly provide the incremental update information to the ground service provider 331 for transmission via the communication network 317 through the transceiver 311 to the CMU 325. Also, the operations control center 321 may provide the incremental update information 327 to the mobile device 315 (for example, an EFB, a smart phone, a laptop, or other personal electronic device). The mobile device 315 may then provide the incremental update information 327 directly to the CMU 325 via the wireless communication interface 323. Alternatively, the mobile device 315 may connect directly to the hardware interface 313 and provide the incremental update information 327 through the hardware interface 313 to the CMU 325.

In additional embodiments, the CMU 325 may communicate with the operations control center 321 via the communication network 317 and/or the mobile device 315 to provide assurances to the operations control center 321 that the database 309 was updated correctly. For example, the CMU 325 may perform integrity and compatibility checks on the received incremental update information 327 and changes made to the database 309 as described above in relation to the generation of the database 209 in FIG. 2. The CMU 325 may communicate the results of the integrity and compatibility checks through any combination of communications through the communication network 317 and/or the mobile device 315. For example, the operations control center 321 may use the mobile device 315 to provide the incremental update information 327 to the CMU 325, but the CMU 325 may provide the results of the integrity and compatibility checks to the operations control center 321 through the ground service provider 331 and the communication network 317. Thus, the database 309 may be updated and verified without having to deploy individuals to the remote location of an aircraft 303 containing the CMU 325 or transmitting an entire database to the aircraft through an expensive communication network 317.

Figure 4:
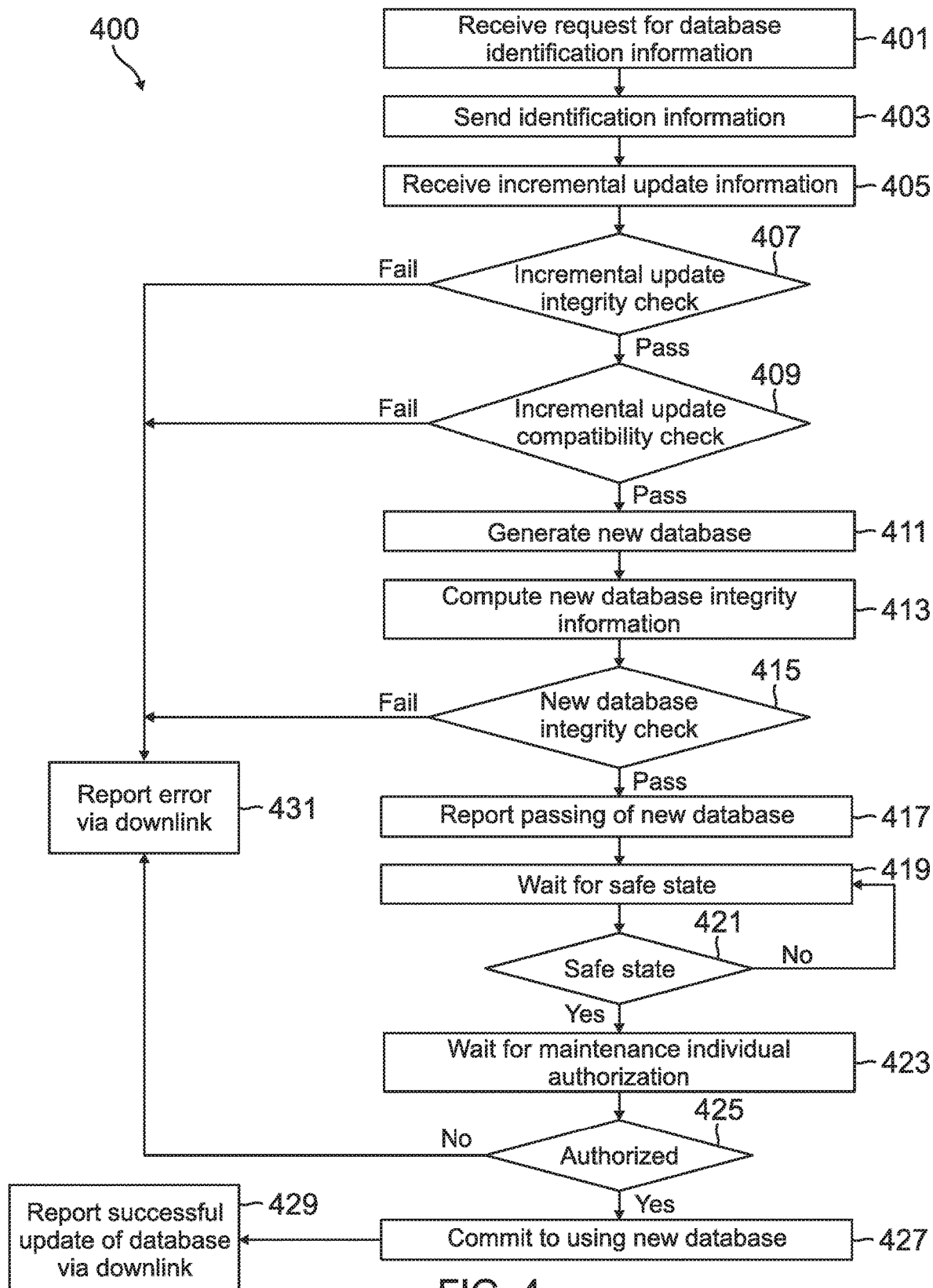
FIG. 4 is a flowchart diagram illustrating an exemplary method for updating remotely-stored databases according to an aspect of the present disclosure.

FIG. 4 is a flowchart of a method 400 performed by a vehicle computer on a remote vehicle, where the vehicle computer performs the method 400 to update a database stored thereon, such as the databases and described above, where the database is managed by an operations control center. Method 400 proceeds at 401 where a request is received for database identification information. For example, an operations control center may provide incremental update information to the vehicle computer through a communication network, a mobile device, or combination thereof. Upon receiving the request, the vehicle computer may acquire the identification information for the database stored thereon. When the vehicle computer has acquired identification information for the database, the method 400 may proceed at 403, where the identification information is sent. For example, the vehicle computer may transmit the acquired identification information to the operations control center. Alternatively, an intermediating device may store the identification information for the database and may provide the identification information to the operations control center.

In certain embodiments, as described above, when the operations control center receives the identification information for the database and determines that the database on the vehicle computer does not match a desired version of the database, the operations control center may create an incremental update containing the changes to be made to a database identified by the received identification information that would update the database to match the desired version of the database. Also, the operations control center may generate information that may be used by the vehicle computer to perform integrity checking to ensure that the database is updated correctly. When the incremental update and the integrity checking information are generated, the operations control center may combine the incremental update and the integrity checking information to create incremental update information as described above. When the operations control center has created the incremental update information, the method 400 proceeds at 405 where the incremental update information is received. For example, the vehicle computer may receive the incremental update information from the operations control center through one or both of a communication network and a mobile device.

In some embodiments, upon reception of the incremental update information, the method 400 proceeds at 407, where a vehicle computer performs an incremental update integrity check. If the incremental update information fails the integrity check, the method 400 proceeds to 431, where the vehicle computer reports an error via a downlink to the operations control center. When the vehicle computer reports an error via the downlink to the operations control center, the vehicle computer will continue to use the database stored on the memory unit in place of any information received in the incremental update information. Conversely, if the incremental update information passes the integrity check, the method 400 proceeds to 409, where the vehicle computer performs an incremental update compatibility check. If the incremental update compatibility check fails, the method 400 proceeds two 431 to report an error via the downlink to the operations control center.

In further embodiments, when the incremental update information passes both the integrity check and the compatibility check, the method 400 proceeds at 411, where a new database is generated. For example, the vehicle computer may perform instructions specified in the incremental update information to the data stored in the database on the vehicle computer to create the new database. In some implementations, the vehicle computer creates the new database without replacing the old database. Accordingly, when the new database is generated, the method 400 may proceed at 413, where new database integrity information is computed. For example, the vehicle computer may calculate a checksum for the data stored in the newly generated database. When the new database integrity information is computed, the method 400 may proceed at 415, where the vehicle computer performs an integrity check for the new database. For example, the vehicle computer may compare the computed new database integrity information against integrity information received as part of the incremental update information from the operations control center. If the new database fails the integrity check, the method 400 may proceed at 431, where the vehicle computer reports an error via a downlink to the operations control center. Alternatively, if the new database passes the integrity check, the method 400 may proceed at 417, where the vehicle computer reports that the new database passed the integrity check to the operations control center via a downlink.

In some embodiments, before adopting the newly generated database, the vehicle computer may wait for the remote vehicle to enter a maintenance state. Thus, the method 400 proceeds at 419, where the vehicle computer waits for a maintenance state. Periodically, the vehicle computer may determine whether or not the remote vehicle is in a maintenance state. Thus, periodically, the method 400 proceeds at 421, where the vehicle computer determines whether or not the remote vehicle is in a maintenance state. If the vehicle computer determines that the remote vehicle is not in a maintenance state, the method 400 returns to 419, where the vehicle computer continues to wait for the remote vehicle to be in a maintenance state. In some implementations, the vehicle computer may determine that the remote vehicle is in a maintenance state by monitoring one or more sensors on the remote vehicle. Alternatively, the vehicle computer may determine that the remote vehicle is a maintenance state as dictated by a schedule, as directed by individual in communication with the vehicle computer, based on location, indication stopped, or engines off, etc. or other source of information that may provide information regarding the present state of the remote vehicle.

In some optional embodiments, when the vehicle computer determines that the remote vehicle is in a maintenance state, the method 400 may proceed at 423, where the vehicle computer waits for authorization from a maintenance individual. In providing authorization, the maintenance individual may be remotely-located with the remote vehicle and provide the authorization directly through a human machine interface associated with the vehicle computer. Alternatively, the maintenance individual may be located at a different location from the vehicle computer and may communicate the authorization through a communication link. While the vehicle computer is waiting for the maintenance individual authorization, the vehicle computer may periodically check to see if the maintenance individual has provided the desired authorization. Accordingly, the method 400 proceeds at 425, where the vehicle computer determines if the new database has been authorized by the maintenance individual. If the maintenance individual does not authorize the new database, the method 400 may proceed at 431 where the vehicle computer reports an error via a downlink to the operations control center. Alternatively, if the maintenance individual authorizes the new database, the method 400 may proceed at 427, where the vehicle computer commits to using the new database in place of the previously stored database. In some alternative implementations, the vehicle computer may commit to using the new database without waiting for maintenance individual authorization or performing integrity checks on the generated database. When the vehicle computer commits to using the new database, the method 400 proceeds at 429, where the vehicle computer reports successful update of the database via the downlink to the operations control center.

Figure 5:
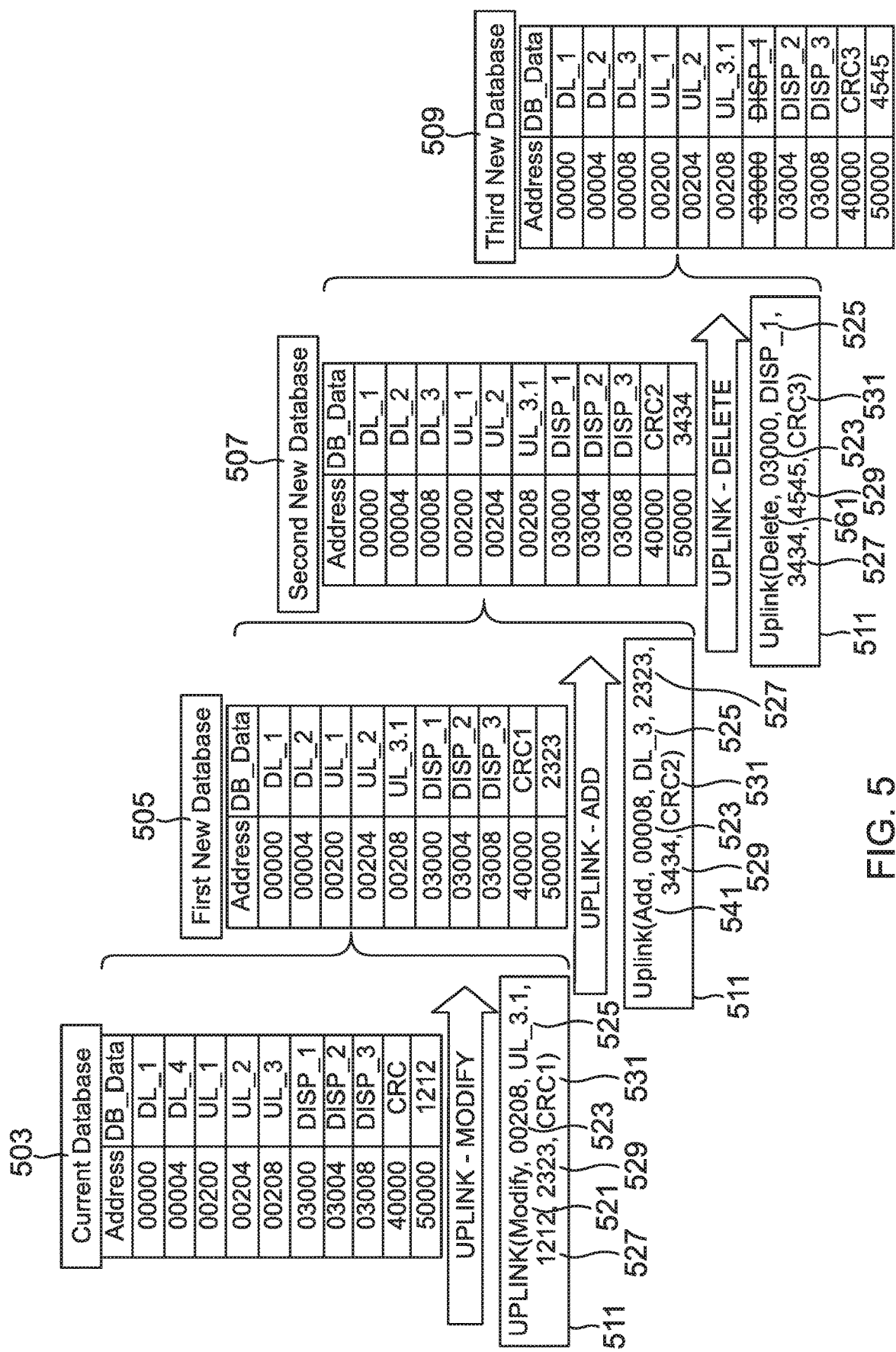
FIG. 5 is a diagram illustrating the handling of various instructions when performing an update of a remotely-stored database according to an aspect of the present disclosure.

FIG. 5 is a diagram illustrating exemplary operations that may be performed on data stored in a database when generating a new database. In particular, FIG. 5 illustrates a modify operation 521, an add operation 541, and a delete operation 561. Additionally, other operations that are not shown may be performed on data stored within a database. As illustrated, a vehicle computer may store a current database 503 and receive incremental update information from an operations control center. In some embodiments the incremental update information may define a series of commands to be performed on the current database 503. As shown, the incremental update information may direct a processing unit on the vehicle computer to perform a modify operation 521, the add operation 541, and the delete operation 561. The operations may be performed in the order specified in the incremental update information or performed in an order as determined by the vehicle computer.

In certain embodiments, the different operations to be performed on the database may be specified within a single function, where the type of operation is specified in the parameters. As illustrated, the operations performed on the database 503 are uplink operations 511 and the first parameter in the operations specifies the type of the operation. For example, the first parameter in the uplink operation 511 may be specified as a modify 521, an add 541, or a delete 561. Additional parameters in the operation may provide data to be used in the performance of the operations specified in the first parameter. Conversely, the different operations may be specified through separate associated functions.

As shown, the processing unit may perform the modify operation 521 on the current database 503 to generate a first new database 505. In addition to the first parameter of the operation 511 that specifies that the operation is a modify operation 521, the functions also call for an address parameter 523, a data parameter 525, a previous database identification parameter 527, a new database identification number 529, and a checksum parameter 531. The address parameter 523 specifies the address of the data to be operated upon within the database to be altered. The data parameter 525 specifies data associated with the address defined in the address parameter 523. The previous database identification parameter 527 specifies identification information for the database to be altered. The new database identification number 529 specifies identification information for the database after alteration. The checksum parameter 531 provides a checksum against which the altered database may be checked to verify that the database was correctly changed.

The modify operation 521, as performed on the current database 503, modifies the data at address 00208 as specified in the address parameter 523. Before the modification, the current database 503 stores "UL_3" at the address 00208. The operation modifies the data such that the first new database 505 stores the data specified in the data parameter 525 at the address 00208. Accordingly, after modification, the first new database 505 stores "UL_3.1" at the address 00208. Additionally, the processing unit may use the data in the previous database identification parameter 527 to verify that the current database 503 is the correct database for modification. As the previous database identification parameter 527 and an identification field in the current database 503 both have the same identification information "1212", the processing unit may determine that the current database 503 is the database to be altered. After alteration, the processing unit may replace the identification information in the identification field in the current database 503 with the identification information in the new database identification parameter 529. Accordingly, after modification, the first new database 505 includes the identification information "2323." Further, the processing unit may use the checksum specified in the checksum parameter 531 to verify that the data was altered correctly. For example, after making the modification specified in the modify operation 521, the processing unit may calculate a checksum for the first new database 505. If the calculated checksum matches the checksum in the checksum parameter 531, the processing unit may determine that the modification was performed correctly. Further, the processing unit may save the checksum in the first new database 505.

The add operation 541, as performed on the first new database 505, adds data for storage at the address 00008 as specified in the address parameter 523. The operation adds the data such that the second new database 507 stores the data specified in the data parameter 525 at the address 00008. Accordingly, after addition, the second new database 507 stores "DL_3.1" at the address 00008. Additionally, the processing unit may use the data in the previous database identification parameter 527, "2323," to verify that the first new database 505 is the correct database for modification. After alteration, the processing unit may replace the identification information in the identification field in the first new database 505 with the identification information, "3434," in the new database identification parameter 529. Further, the processing unit may use the checksum specified in the checksum parameter 531 to verify that the data was altered correctly. Further, the processing unit may save the calculated checksum in the second new database 507.

The delete operation 561, as performed on the second new database 507, deletes data stored at the address 03000 as specified in the address parameter 523. The operation removes the data "DISP_1" stored at the address 03000 from the second new database 507 to create the third new database 509. Additionally, the processing unit may use the data in the previous database identification parameter 527, "3434," to verify that the second new database 507 is the correct database for modification. After alteration, the processing unit may replace the identification information in the identification field in the second new database 507 with the identification information, "4545," in the new database identification parameter 529. Further, the processing unit may use the checksum specified in the checksum parameter 531 to verify that the data was altered correctly. Further, the processing unit may save the calculated checksum in the third new database 509. Accordingly, the functions may be used to perform multiple operations on a database.

Figure 6:
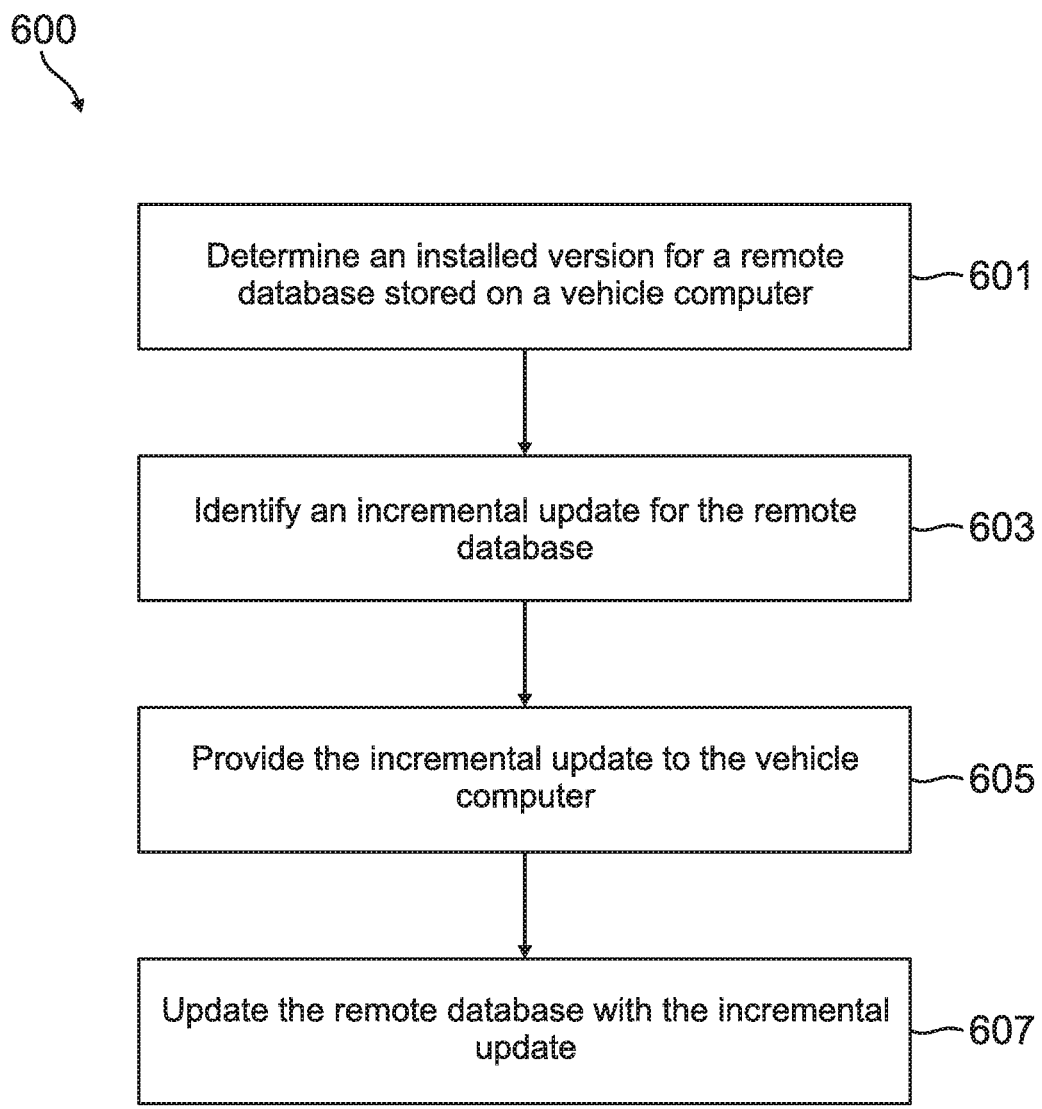
FIG. 6 is a flowchart diagram illustrating an exemplary method for incrementally updating a remotely-stored database according to an aspect of the present disclosure.

FIG. 6 is a flowchart diagram of a method 600 for using an incremental update to update a remote database. In certain embodiments, method 600 proceeds at 601, where an installed version for a remote database stored on a vehicle computer is determined. Additionally, method 600 proceeds at 603, where an incremental update is identified for the remote database. Moreover, method 600 proceeds at 605, where the incremental update is provided to the vehicle computer. Also, method 600 proceeds at 607, where the remote database is updated with the incremental update.

EXAMPLE EMBODIMENTS

Example 1 includes a method comprising: determining an installed version for a remote database stored on a vehicle computer; identifying an incremental update for the remote database, wherein the incremental update contains differences between a desired version for the remote database and the installed version; providing the incremental update to the vehicle computer; and updating the remote database with the incremental update.

Example 2 includes the method of Example 1, further comprising installing the remote database without physical intervention of human personnel.

Example 3 includes the method of any of Examples 1-2, wherein the remote database is a loadable database to an avionics unit.

Example 4 includes the method of Example 3, wherein the loadable database is one of: an airlines operation control database; a database associated with a flight management computer; and a navigational database.

Example 5 includes the method of any of Examples 1-4, further comprising determining a safe state to install the incremental update in the remote database.

Example 6 includes the method of any of Examples 1-5, wherein providing the incremental update to the vehicle computer comprises directly transmitting the incremental update to the vehicle computer.

Example 7 includes the method of any of Examples 1-6, wherein the incremental update is provided to the vehicle computer through an intermediating device.

Example 8 includes the method of any of Examples 1-7, further comprising performing an integrity check and validation on the updated remote database.

Example 9 includes the method of any of Examples 1-8, wherein providing the incremental update to the vehicle computer further comprises providing to the vehicle computer at least one of: integrity check information; security data; and verification information.

Example 10 includes the method of any of Examples 1-9, further comprising performing an integrity check, compatibility check, validation that a configuration of the update remote database is correct, and verification on the incremental update.

Example 11 includes a system comprising: a memory unit having a database stored thereon; and a processing unit that executes computer executable instructions, the computer executable instructions directing the processing unit to: receive an incremental update for the database from an operations control center through a communications channel, wherein the system is remotely-located from the operations control center and the incremental update contains differences between a desired version for the database and a current version of the database; and update the database with the incremental update.

Example 12 includes the system of Example 11, wherein the executable instructions further cause the processing unit to: handle a request for identification information of the database from the remote operations control center; acquire the identification information of the database; and transmit the identification information of the database to the remote operations control center.

Example 13 includes the system of any of Examples 11-12, wherein the update of the database is performed without physical intervention of human personnel.

Example 14 includes the system of any of Examples 11-13, wherein the computer executable instructions direct the processing unit to: monitor a state for the system; determine that the state is a safe state; and update the database when the state is the safe state.

Example 15 includes the system of any of Examples 11-14, wherein the processing unit receives the incremental update directly from the remote operations control center through the communications channel.

Example 16 includes the system of any of Examples 11-15, wherein the processing unit is able to receive the incremental update from an intermediating device through the communication channel.

Example 17 includes the system of any of Examples 11-16, wherein the incremental update is provided to the vehicle computer through an intermediating device.

Example 18 includes the system of any of Examples 11-17, wherein the processing unit is further configured to perform an integrity check and/or validation on at least one of: the updated database; and the incremental update.

Example 19 includes the system of any of Examples 11-18, wherein the processing unit transmits an indication that the database was updated correctly to the operations control center upon successful completion of the database update.

Example 20 includes a system comprising: an operations control center; a remote vehicle in communication with the operations control center, the remote vehicle comprising a vehicle computer that comprises: a memory unit having a database stored thereon, wherein the database is managed by an organization associated with the operations control center; and a processing unit that executes computer executable instructions, the computer executable instructions directing the processing unit to: acquire identification information of the database for transmission to the operations control center; receive an incremental update for the database directly from the operations control center through a communications channel, wherein the incremental update contains differences between a desired version for the database and a current version of the database; update the database with the incremental update; perform an integrity check on one or more of the updated database and the incremental update; and provide a report of the status of the database update for transmission to the operations control center; wherein the operations control center creates the incremental update based on the identification information received from the remote vehicle.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method comprising:
   determining an installed version for a remote database stored on a vehicle computer;
   identifying an incremental update for the remote database, wherein the incremental update specifies a list of commands to be performed by the vehicle computer, wherein each command in the list of commands directs the vehicle computer to perform at least one of an add of data to, modify of data in, or delete data from a specified location in the remote database, wherein performing the list of commands changes the installed version into a desired version for the remote database, wherein each command comprises an integrity check value used to verify the integrity of the remote database after the performance of each command;
   providing the incremental update to the vehicle computer through an air-ground communication network having a data size limit for messages; and
   updating the remote database with the incremental update through executing the list of commands by the vehicle computer.

2. The method of claim 1, further comprising installing the remote database without physical intervention of human personnel.

3. The method of claim 1, wherein the remote database is a loadable database to an avionics unit.

4. The method of claim 3, wherein the loadable database is one of:
   an airlines operation control database;
   a database associated with a flight management computer; and
   a navigational database.

5. The method of claim 1, further comprising determining a safe state to install the incremental update in the remote database.

6. The method of claim 1, wherein providing the incremental update to the vehicle computer comprises directly transmitting the incremental update to the vehicle computer.

7. The method of claim 1, wherein the incremental update is provided to the vehicle computer through an intermediating device.

8. The method of claim 1, further comprising performing an integrity check and validation on the updated remote database.

9. The method of claim 1, wherein a command in the list of commands further comprises at least one of:
   integrity check information;
   security data; and
   verification information.

10. The method of claim 1, further comprising performing an integrity check, compatibility check, validation that a configuration of the update remote database is correct, and verification on the incremental update.

11. A system comprising:
    a memory unit having a database stored thereon; and
    a processing unit that executes computer executable instructions, the computer executable instructions directing the processing unit to:
      receive an incremental update for the database from an operations control center through an air-ground communications channel having a data size limit for messages, wherein the system is remotely-located from the operations control center and the incremental update specifies a list of commands to be performed by the processing unit, wherein each command in the list of commands directs the processing unit to perform at least one of an add of data to, modify of data in, or delete data from a specified location in the remote database, wherein performing commands in the list of commands changes a current version of the database into a desired version for the database, wherein each command comprises an integrity check value and the processing unit verifies the integrity of the database using the integrity check value after the performance of each command; and
      update the database with the incremental update by performing the commands in the list of commands.

12. The system of claim 11, wherein the executable instructions further cause the processing unit to:
    handle a request for identification information of the database from the remote operations control center;
    acquire the identification information of the database; and
    transmit the identification information of the database to the remote operations control center.

13. The system of claim 11, wherein the incremental update of the database is performed without physical intervention of human personnel.

14. The system of claim 11, wherein the computer executable instructions direct the processing unit to:
monitor a state for the system;
determine that the state is a safe state; and
update the database when the state is the safe state.

15. The system of claim 11, wherein the processing unit receives the incremental update directly from the remote operations control center through the communications channel.

16. The system of claim 11, wherein the processing unit is able to receive the incremental update from an intermediating device through the communication channel.

17. The system of claim 11, wherein the incremental update is provided to the processing unit through an intermediating device.

18. The system of claim 11, wherein the processing unit is further configured to perform an integrity check and/or validation on at least one of:
the updated database; and
the incremental update.

19. The system of claim 11, wherein the processing unit transmits an indication that the database was updated correctly to the operations control center upon successful completion of the incremental update.

20. A system comprising:
an operations control center;
a remote vehicle in communication with the operations control center, the remote vehicle comprising a vehicle computer that comprises:
a memory unit having a database stored thereon, wherein the database is managed by an organization associated with the operations control center; and
a processing unit that executes computer executable instructions, the computer executable instructions directing the processing unit to:
acquire identification information of the database for transmission to the operations control center;
receive an incremental update for the database directly from the operations control center through an air-ground communications channel having a data size limit for messages, wherein the incremental update specifies a list of commands to be performed by the processing unit, wherein each command in the list of commands directs the processing unit to perform at least one of an add of data to, modify of data in, or delete data from a specified location in the database, wherein performing the list of commands changes a current version of the database into a desired version for the database, wherein each command comprises an integrity check value;
update the database with the incremental update;
perform an integrity check after each command on one or more of the updated database and the incremental update using the integrity check value; and
provide a report of a status of the incremental update for transmission to the operations control center;
wherein the operations control center creates the incremental update based on the identification information received from the remote vehicle.

* * * * *